United States Patent
Kim et al.

(10) Patent No.: US 11,637,279 B2
(45) Date of Patent: Apr. 25, 2023

(54) CATHODE ACTIVE MATERIAL FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: Sang Bok Kim, Daejeon (KR); Sang Hye Shin, Daejeon (KR); Sang Min Park, Daejeon (KR); Tae Kyoung Lee, Daejeon (KR); Myoung Lae Kim, Daejeon (KR); Jeong Bae Yoon, Daejeon (KR); Jik Soo Kim, Daejeon (KR); Ji Hoon Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/512,440

(22) Filed: Oct. 27, 2021

(65) Prior Publication Data
US 2022/0367851 A1    Nov. 17, 2022

(30) Foreign Application Priority Data

Apr. 22, 2021    (KR) .................. 10-2021-0052405

(51) Int. Cl.
*H01M 4/36*  (2006.01)
*H01M 4/505* (2010.01)
*H01M 4/525* (2010.01)
*H01M 4/60*  (2006.01)
(Continued)

(52) U.S. Cl.
CPC ........... *H01M 4/364* (2013.01); *H01M 4/505* (2013.01); *H01M 4/525* (2013.01); *H01M 4/60* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2020/0152978 A1    5/2020    Cho et al.

FOREIGN PATENT DOCUMENTS

| CN | 107204424 A | 9/2017 |
| CN | 108075111 A | 5/2018 |
| CN | 111422920 A | 7/2020 |

(Continued)

OTHER PUBLICATIONS

J.-W. Oh, R.-G. Oh, J.-E. Hong, W.-G. Yang, K.-S. Ryu. The Coating Effects of Al2O3 on a Li[Li0.2Mn0.54Co0.13Ni0.13]O2 Surface Modified with (NH4)2SO4, Bull. Korean Chem. Soc. 2014, vol. 35, No. 5, 1516-1522.*

(Continued)

*Primary Examiner* — Carlos Barcena
(74) *Attorney, Agent, or Firm* — IP & T Group LLP

(57) ABSTRACT

The cathode active material for a lithium secondary battery according to embodiments of the present invention includes a lithium-transition metal composite oxide particle including a plurality of primary particles, and the lithium-transition metal composite oxide particle includes a lithium-sulfur-containing portion formed between the primary particles. Thereby, it is possible to improve life-span properties and capacity properties by preventing the layer structure deformation of the primary particles and removing residual lithium.

13 Claims, 4 Drawing Sheets

(51) Int. Cl.
H01M 10/0525 (2010.01)
H01M 4/02 (2006.01)

(56) References Cited

FOREIGN PATENT DOCUMENTS

| | | |
|---|---|---|
| EP | 2741354 A1 | 6/2014 |
| JP | 2006-172753 A | 6/2006 |
| JP | 2009-146739 A | 7/2009 |
| JP | 2010-080168 A | 4/2010 |
| JP | 2011-096626 A | 5/2011 |
| JP | 2012-042098 A | 3/2012 |
| JP | 4923397 B2 | 4/2012 |
| JP | 6071969 B2 | 2/2017 |
| JP | 2020-525998 A | 8/2020 |
| JP | 2021-042098 A | 3/2021 |
| KR | 10-0821523 B1 | 4/2008 |
| KR | 10-2015-0048410 A | 5/2015 |
| KR | 10-2016-0038294 A | 4/2016 |
| KR | 10-2021-0039518 A | 4/2021 |

OTHER PUBLICATIONS

Office Action for the Chinese Patent Application No. 202210221886.7 issued by the Chinese Patent Office dated Sep. 8, 2022.
Extended European Search Report issued by the European Patent Office dated Apr. 20, 2022.
Francis A S et al., Stabilized Behavior of $LiNi_{0.85}Co_{0.10}Mn_{0.05}O_2$ Cathode Materials Induced by Their Treatment with $SO_2$, ACS Applied Energy Materials, 2020, pp. 3609-3618, ACS Publications.

* cited by examiner

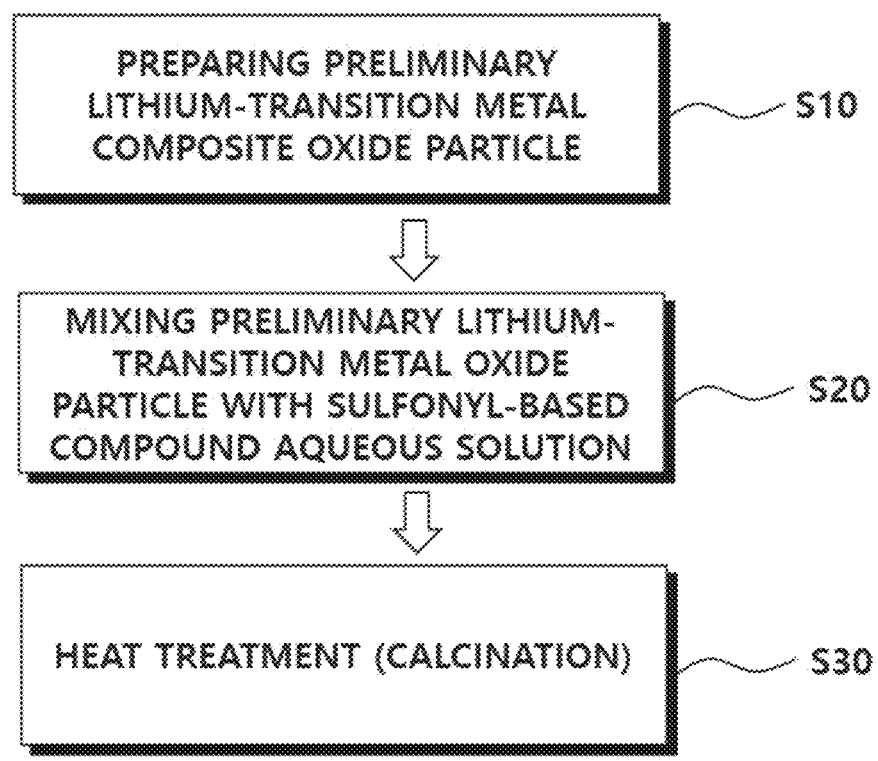

[FIG. 2]
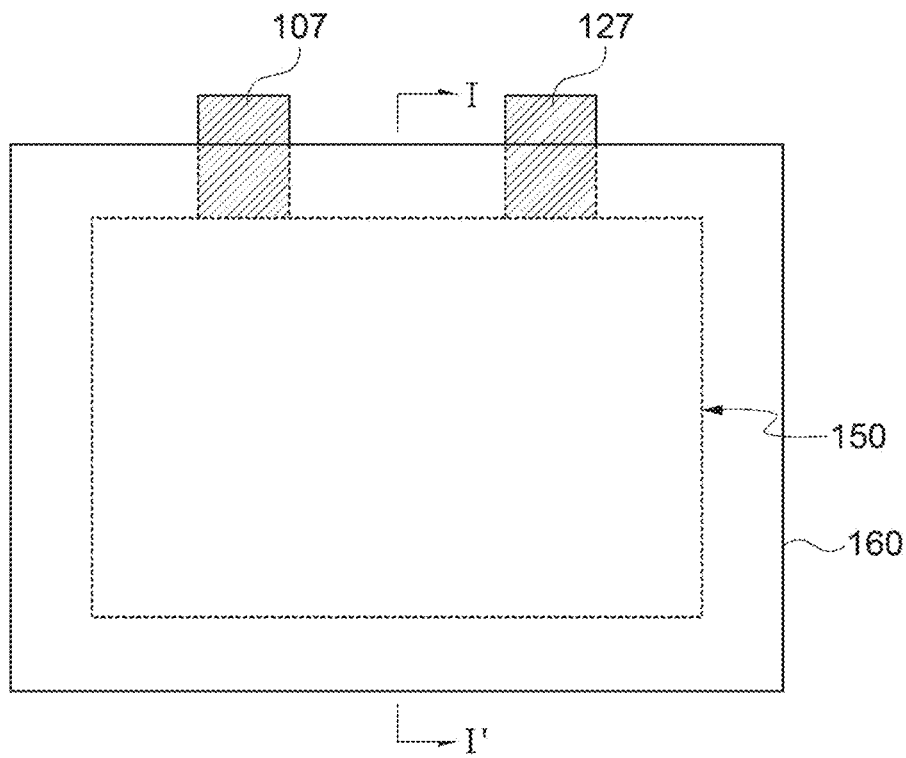
[FIG. 3]
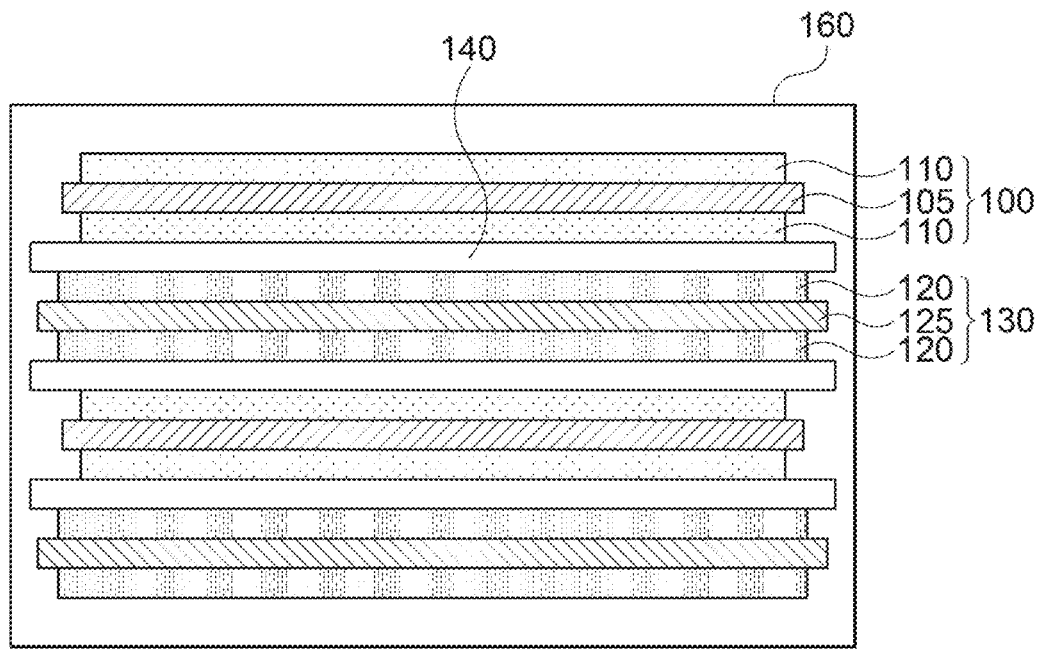

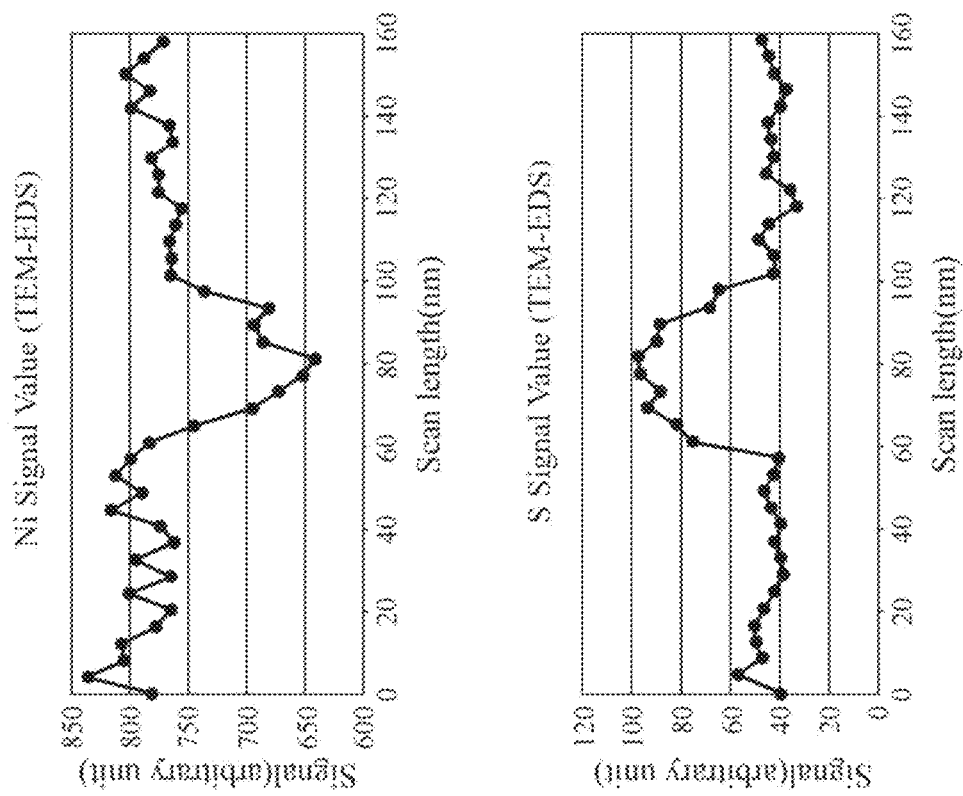
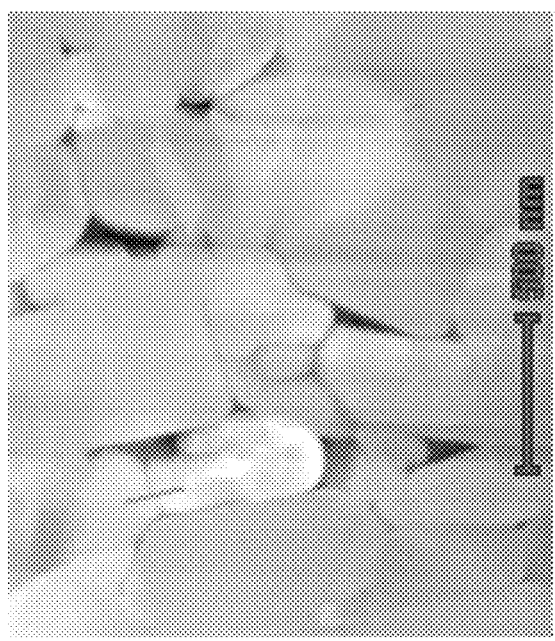
FIG.4 (b)
FIG.4 (a)

[FIG. 5]
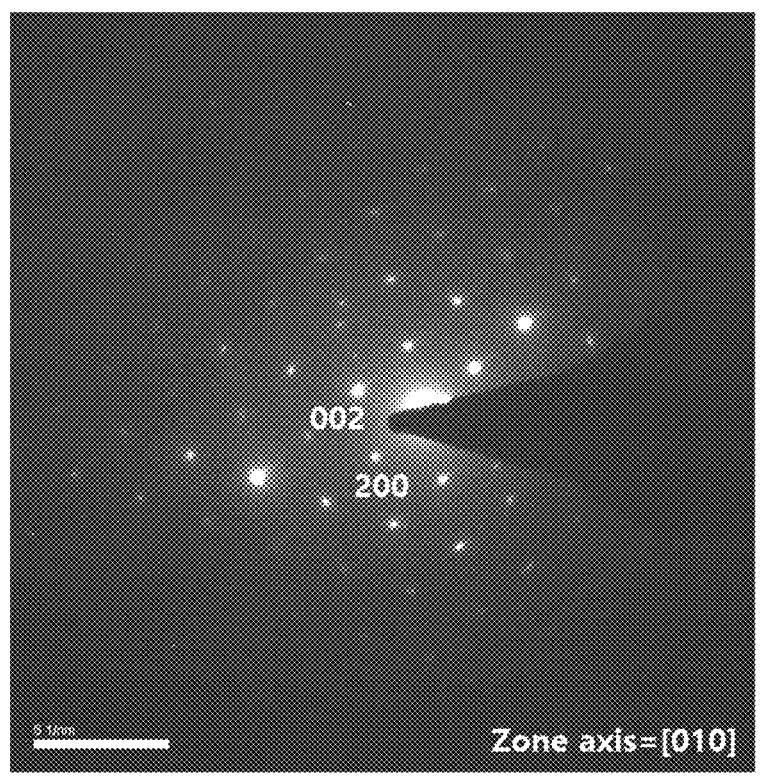

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2021-0052405 filed on Apr. 22, 2021 in the Korean Intellectual Property Office (KIPO), the entire disclosure of which is incorporated by reference herein.

BACKGROUND OF THE INVENTION

1. Field of the Invention

The present invention relates to a cathode active material for a lithium secondary battery and a method of manufacturing the same, and more particularly, to a lithium metal oxide-based cathode active material for a lithium secondary battery and a method of manufacturing the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight, such that development thereof has been proceeded in this regard.

The lithium secondary battery may include: an electrode assembly including a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are housed.

As an active material for a cathode of a lithium secondary battery, a lithium-transition metal composite oxide may be used. Examples of the lithium-transition metal composite oxide may include a nickel-based lithium metal oxide.

A lithium secondary battery having longer life-span, high capacity, and operational stability is required as the application range thereof is expanded. In the lithium-transition metal composite oxide used as the active material for a cathode, when non-uniformity in the chemical structure is caused due to precipitation of lithium, etc., it may be difficult to implement a lithium secondary battery having desired capacity and life-span. In addition, when a deformation or a damage of the lithium-transition metal composite oxide structure is caused during repeated charging and discharging, life-span stability and capacity maintenance properties may be reduced.

For example, Korean Patent Registration Publication No. 10-0821523 discloses a method of removing lithium salt impurities by washing a lithium-transition metal composite oxide with water, but there is a limitation in sufficient removal of the impurities, and a damage to the surface of particles may be caused in a water washing process.

PRIOR ART DOCUMENT

Patent Document (Patent Document) Korean Patent Registration Publication No. 10-0821523

SUMMARY OF THE INVENTION

It is an object of the present invention to provide a cathode active material for a lithium secondary battery having improved operational stability and electrochemical properties, and a method of manufacturing the same.

Another object of the present invention to provide a lithium secondary battery including the cathode active material having improved operational stability and electrochemical properties.

To achieve the above objects, according to an aspect of the present invention, there is provided a cathode active material for a lithium secondary battery including: a lithium-transition metal composite oxide particle including a plurality of primary particles, wherein the lithium-transition metal composite oxide particle comprises a lithium-sulfur-containing portion formed between the primary particles.

In some embodiments, the lithium-sulfur-containing portion may have a monoclinic crystal structure.

In some embodiments, a sulfur content in the lithium-transition metal composite oxide particle measured through a carbon-sulfur (CS) analyzer may be 2,000 to 7,000 ppm based on a total weight of the lithium-transition metal composite oxide particle.

In some embodiments, an average sulfur signal value of the lithium-sulfur-containing portion measured through energy dispersive spectroscopy (EDS) may be greater than the average sulfur signal value in the primary particles measured through the EDS.

In some embodiments, the average sulfur signal value of the lithium-sulfur-containing portion measured through the EDS may be 1.2 to 3.8 times greater than the average sulfur signal value in the primary particles measured through the EDS.

In some embodiments, the lithium-sulfur-containing portion may be derived from a sulfonyl-based compound represented by Structural Formula 1 below:

[Structural Formula 1]

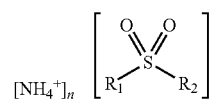

(In Structural Formula 1, n is 0≤n<3, $R_1$ and $R_2$ are O$^-$, NH$_2$, NH$_3^+$, OH, or a hydrocarbon group having 1 to 3 carbon atoms that can be substituted with a substituent, and the substituent may include a halogen, cyano group, hydroxyl group, phosphoric acid group, carboxyl group or a salt thereof).

In some embodiments, the hydrocarbon group included in $R_1$ and $R_2$ in Structural Formula 1 may be substituted with or connected to at least one selected from the group consisting of a carbon-carbon double bond, —O—, —S—, —CO—, —OCO—, —SO—, —CO—O—, —OCO—O—, —SO—CO—, —S—CO—O—, —CO—NH—, —NH—CO—O—, —NR'—,

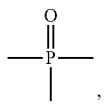

—S—S— and —SO$_2$—, and R' may be a hydrogen atom or an alkyl group having 1 to 3 carbon atoms.

In some embodiments, the sulfonyl-based compound may include at least one of compounds of Formulae 1 to 3 below:

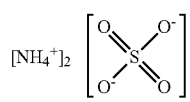
[Formula 1]

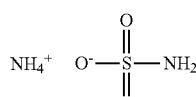
[Formula 2]

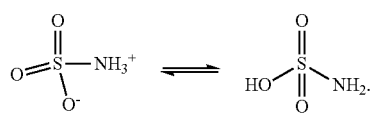
[Formula 3]

In some embodiments, the primary particles may have a hexagonal close-packed structure.

In some embodiments, a content of lithium carbonate (Li$_2$CO$_3$) remaining on the surface of the lithium-transition metal composite oxide particle may be 2,500 ppm or less based on the total weight of the lithium-transition metal composite oxide particle, and a content of lithium hydroxide (LiOH) remaining on the surface of the lithium-transition metal composite oxide particle may be 2,000 ppm or less based on the total weight of the lithium-transition metal composite oxide particle.

According to another aspect of the present invention, there is provided a method of manufacturing a cathode active material for a lithium secondary battery including: preparing a preliminary lithium-transition metal composite oxide particle; mixing the preliminary lithium-transition metal composite oxide particle with a sulfonyl-based compound aqueous solution including the sulfonyl-based compound according to the above-described embodiment; and performing a heat treatment on the mixed preliminary lithium-transition metal composite oxide particle and the sulfonyl-based compound aqueous solution, to prepare a lithium-transition metal composite oxide particle comprising a plurality of primary particles and a lithium-sulfur-containing portion formed between the primary particles.

In some embodiments, the sulfonyl-based compound aqueous solution may be formed by inputting the sulfonyl-based compound into a solvent, and a weight of the solvent may be 2 to 20% by weight based on the total weight of the preliminary lithium-transition metal composite oxide particle.

In some embodiments, an amount of the sulfonyl-based compound input into the solvent may be 0.5 to 2.5% by weight based on the total weight of the preliminary lithium-transition metal composite oxide particles.

In some embodiments, the heat treatment may be performed at 250 to 450° C. under an oxygen atmosphere.

In some embodiments, the preliminary lithium-transition metal composite oxide particles may be mixed with the sulfonyl-based compound aqueous solution without water washing treatment.

According to another aspect of the present invention, there is provided a lithium secondary battery including: a cathode which comprises a cathode active material layer comprising the cathode active material for a lithium secondary battery according to the above-described embodiments; and an anode disposed to face the cathode.

The cathode active material according to embodiments of the present invention may include lithium-transition metal composite oxide particles including the plurality of primary particles, and the lithium-transition metal composite oxide particles may include the lithium-sulfur-containing portion formed between the primary particles. In this case, residual lithium located on the surface of the lithium-transition metal composite oxide reacts with the sulfonyl-based compound to be converted into the lithium-sulfur-containing portion, such that initial capacity and battery efficiency properties may be improved.

In some embodiments, it is possible to form the lithium-sulfur-containing portion having a monoclinic crystal structure between the primary particles in the lithium-transition metal composite oxide. In this case, a specific surface area of the lithium-transition metal composite oxide may be reduced, and the surface of the primary particles may be protected by the lithium-sulfur-containing portion, thereby improving life-span properties and driving stability of the secondary battery.

The lithium-sulfur-containing portion having the monoclinic crystal structure diffuses lithium through a paddle-wheel mechanism, such that the battery may have excellent ion conductivity and improved battery properties by reducing a resistance in the lithium-transition metal composite oxide particles.

In the method of manufacturing a cathode active material according to embodiments of the present invention, a sulfonyl-based compound aqueous solution may be prepared by inputting a predetermined amount of a sulfonyl-based compound into a solvent in an amount of 2 to 20% by weight ('wt. %') based on the total weight of the preliminary lithium-transition metal composite oxide, and mixing the same without including a water washing process. In this case, it is possible to prevent the primary particles of the lithium-transition metal composite oxide particles from being deformed from the hexagonal close-packed structure to the face-centered cubic structure during water washing treatment. Thereby, it is possible to prevent the initial capacity and life-span properties of the secondary battery from being reduced. In addition, residual lithium located on the surface portion of the lithium-transition metal composite oxide particles is removed, such that a deterioration in the life-span properties due to gas generation may be prevented, and battery resistance may be reduced to improve initial capacity.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a process flow chart illustrating a method of manufacturing a cathode active material according to exemplary embodiments;

FIGS. 2 and 3 are a schematic plan view and a cross-sectional view of a lithium secondary battery according to exemplary embodiments, respectively;

FIG. 4($a$) is an image and FIG. 4($b$) is graphs illustrating energy dispersive spectroscopy (TEM-EDS) analysis results for analyzing chemical properties of the lithium-transition metal composite oxide particles according to Example 1; and FIG. 5 is a TEM-SAED analysis image for evaluating crystallographic properties of a lithium-sulfur compound of the lithium-transition metal composite oxide particles according to Example 1.

DETAILED DESCRIPTION OF THE INVENTION

Embodiments of the present invention provide a cathode active material including lithium-transition metal composite oxide particles and a lithium secondary battery including the same.

Hereinafter, exemplary embodiments of the present invention will be described in detail with reference to the accompanying drawings. However, these embodiments are merely an example, and the present invention is not limited to the specific embodiments described as the example.

In exemplary embodiments, the cathode active material may include a lithium-transition metal composite oxide particle including a plurality of primary particles, and the lithium-transition metal composite oxide particle may include a lithium-sulfur (Li—S) containing portion formed between the primary particles.

In some embodiments, the primary particles may have a single crystal or polycrystalline structure in crystallography.

For example, the primary particles may include nickel (Ni), and may further include at least one of cobalt (Co) and manganese (Mn).

For example, the primary particles may have a composition represented by Formula 1 below:

[Formula 1]

In Formula 1, a, x and y may be in a range of $0.9 \leq a \leq 1.2$, $x \geq 0.5$, and $-0.1 \leq y \leq 0.1$. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba or Zr.

In some preferred embodiments, a molar ratio or concentration x of Ni in Formula 1 may be 0.8 or more, and preferably, greater than 0.8.

For example, when employing a composition of high-nickel (high-Ni) contents in which x is 0.8 or more, calcination of the lithium-transition metal composite oxide particles may be performed at a relatively low temperature. In this case, an amount of residual lithium generated on the surface of the lithium-transition metal composite oxide particles may be increased. Accordingly, a water washing process or a non-water washing process (e.g., an initial wetting method) for removing the same may be performed. Therefore, when x is 0.8 or more, for example, the above process for removing the residual lithium may be substantially significant.

Ni may be provided as a transition metal associated with the output and capacity of the lithium secondary battery. Therefore, as described above, by employing the composition of high-nickel (high-Ni) contents in the lithium-transition metal composite oxide particles, it is possible to provide a high-power cathode and a high-power lithium secondary battery.

In this regard, as the content of Ni is increased, the long-term storage stability and life-span stability of the cathode or the secondary battery may be relatively deteriorated. However, according to exemplary embodiments, by including Co, the life-span stability and capacity retention properties may be improved through Mn while maintaining electrical conductivity.

In some embodiments, the primary particles of the lithium-transition metal composite oxide particle may have a hexagonal close-packed structure. Accordingly, a large amount of lithium and transition metal elements may be included in a stable structure having a layered form even in a small space, such that the capacity properties and life-span properties of the secondary battery may be improved.

In some embodiments, the lithium-sulfur-containing portion may have a monoclinic structure. For example, lithium hydroxide (LiOH) or lithium carbonate ($Li_2CO_3$) remaining on the surface of lithium-transition metal composite oxide particle may react with a sulfonyl-based compound to be described below, and then subjected to heat treatment at a predetermined temperature, thus to obtain a lithium-sulfur-containing portion having a monoclinic structure. In this case, the residual lithium may be converted into a structurally stable lithium-sulfur-containing compound to allow it to exist around the primary particles. Accordingly, initial capacity and battery efficiency properties may be improved, and a deterioration in life-span properties caused by residual lithium may be prevented.

For example, the crystal structure of the lithium-sulfur-containing portion may be confirmed through transmission electron microscope-selected area electron diffraction (TEM-SAED) analysis.

For example, the lithium-sulfur-containing portion may include at least one of lithium sulfate ($Li_2SO_4$), lithium sulfate monohydrate ($Li_2SO_4 \cdot H_2O$), lithium ammonium sulfate ($Li(NH_4)SO_4$), lithium hydroxylammonium sulfate ($Li(NH_3)(OH)SO_4$), lithium fluorosulfate ($LiSO_3F$), lithium hydrogen sulfate ($LiHSO_4$), and lithium sulfide ($Li_2S$).

In exemplary embodiments, the lithium-sulfur-containing portion may be derived from a sulfonyl-based compound represented by Structural Formula 1 below.

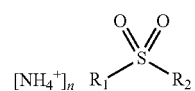

[Structural Formula 1]

In Structural Formula 1, n may be $0 \leq n < 3$, $R_1$ and $R_2$ may be $O^-$, $NH_2$, $NH_3^+$, OH, or a hydrocarbon group having 1 to 3 carbon atoms that can be substituted with a substituent, and the substituent may include a halogen, cyano group, hydroxyl group, phosphoric acid group, carboxyl group or a salt thereof.

In some embodiments, the hydrocarbon group included in $R_1$ and $R_2$ in Structural Formula 1 may be substituted with or connected to at least one selected from the group consisting of a carbon-carbon double bond, —O—, —S—, —CO—, —OCO—, —SO—, —CO—O—, —OCO—O—, —S—CO—, —S—CO—O—, —CO—NH—, —NH—CO—O—, —NR'—,

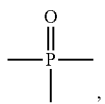

—S—S— and —SO$_2$—, and R' may be a hydrogen atom or an alkyl group having 1 to 3 carbon atoms.

In some embodiments, the above-described sulfonyl-based compound may include at least one of the compounds represented by Formulae 1 to 3 below.

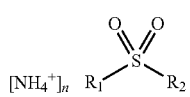
[Formula 1]

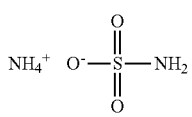
[Formula 2]

[Formula 3]

For example, the sulfonyl-based compound represented by Structural Formula 1 described above may be input in a form of a sulfonyl-based compound aqueous solution to be described below. In this case, the sulfonyl-based compound may react with lithium remaining on the surface of the lithium-transition metal composite oxide particles to form the lithium-sulfur-containing portion. Thereby, residual lithium may be removed to improve the capacity properties and life-span properties of the secondary battery.

In some embodiments, a sulfur content included in the lithium-transition metal composite oxide particle may be 2,000 to 7,000 ppm based on a total weight of the lithium-transition metal composite oxide particles. In this case, while sufficient sulfonyl-based compound reacts with the residual lithium to improve battery life-span properties, it is possible to prevent a deterioration in battery output properties due to excessive sulfur concentration.

In some embodiments, an average sulfur signal value in the lithium-sulfur-containing portions measured through energy dispersive spectroscopy (EDS) may be greater than the average sulfur signal value in the primary particles measured through the EDS. In this case, the lithium-transition metal composite oxide particles may form a concentration gradient across the primary particles and the lithium-sulfur-containing portion.

In some embodiments, the average sulfur signal value of the lithium-sulfur-containing portion measured through EDS may be 1.2 to 3.8 times greater than the average sulfur signal value in the primary particles measured through EDS. In this case, the lithium-sulfur-containing portions may be sufficiently formed in the region between the primary particles to prevent excessive sulfur from being remained due to excessive sulfur input, while protecting the surface of the primary particles. Accordingly, it is possible to prevent deterioration in the initial capacity and capacity efficiency of the battery while improving the life-span properties of the battery.

In addition, for example, the lithium-sulfur-containing portions having a monoclinic crystal structure may be sufficiently formed between the primary particles included in the lithium-transition metal composite oxide particles. In this case, the surface of the primary particles may be protected by the lithium-sulfur-containing portions, thereby reducing an area where the primary particles are exposed to an electrolyte. Accordingly, the life-span properties of the secondary battery may be improved. In addition, as residual lithium on the surface of the lithium-transition metal composite oxide particles has been sufficiently removed, the electrochemical properties of the secondary battery may be improved in this state.

In some embodiments, a content of lithium precursor remaining on the surface of the lithium-transition metal composite oxide particles may be controlled.

For example, the content of lithium carbonate (Li$_2$CO$_3$) remaining on the surface of the lithium-transition metal composite oxide particle may be 2,500 ppm or less, and the content of lithium hydroxide (LiOH) remaining on the surface of the lithium-transition metal composite oxide particle may be 2,500 ppm or less.

When the contents of lithium carbonate and lithium hydroxide satisfy the above ranges, a resistance may be decreased during lithium ion movement, such that the initial capacity properties and output properties of the lithium secondary battery may be improved, and life-span properties during repeated charging and discharging may be enhanced.

In exemplary embodiments, the lithium-sulfur-containing portion may be formed between the primary particles.

For example, the aqueous solution of the sulfonyl-based compound to be described below may permeate between the primary particles by a capillary force. In this case, the sulfonyl-based compound may react with residual lithium between the primary particles, and the lithium-sulfur-containing portion may be formed between the primary particles by subsequent heat treatment. Accordingly, the lithium-sulfur-containing portion is distributed not only on the surface of the secondary particles as a whole but also in a region between the primary particles, such that even the region between the primary particles may be sufficiently protected when impregnated with the electrolyte.

In addition, for example, residual lithium that was present between the primary particles may be converted into a lithium-sulfur compound having a monoclinic crystal structure. In this case, since the lithium-sulfur compound moves lithium by a paddle-wheel mechanism, excellent lithium ion conductivity may be implemented. Accordingly, the battery resistance may be reduced and the capacity and output properties of the battery may be improved.

The paddle-wheel mechanism may refer to a phenomenon in which, for example, elements including oxygen rotate about sulfur ions constituting anions and move lithium ions to reduce activation energy required for lithium ion movement.

FIG. 1 is a process flow chart illustrating a method of manufacturing a cathode active material according to exemplary embodiments.

Hereinafter, description of the method of manufacturing the cathode active material for a lithium secondary battery according to exemplary embodiments described above will be provided with reference to FIG. 1.

Referring to FIG. 1, a preliminary lithium-transition metal composite oxide particle may be prepared (e.g., step S10).

For example, the preliminary lithium-transition metal composite oxide particle may be prepared by reacting a transition metal precursor with a lithium precursor. The transition metal precursor (e.g., Ni—Co—Mn precursor) may be prepared through a co-precipitation reaction.

For example, the transition metal precursor may be prepared through a co-precipitation reaction of metal salts. The metal salts may include nickel salts, manganese salts and cobalt salts.

Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, and a hydrate thereof, etc.

The metal salts may be mixed with a precipitant and/or a chelating agent in a ratio satisfying the content of each metal or the concentration ratios described with reference to Formula 1 to prepare an aqueous solution. The aqueous solution may be co-precipitated in a reactor to prepare the transition metal precursor.

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

The temperature of the co-precipitation reaction may be controlled, for example, in a range of about 40° C. to 60° C. The reaction time may be controlled in a range of about 24 to 72 hours.

The lithium precursor compound may include, for example, lithium carbonate, lithium nitrate, lithium acetate, lithium oxide, lithium hydroxide and the like. These compounds may be used alone or in combination of two or more thereof.

In exemplary embodiments, the sulfonyl-based compound aqueous solution including the above-described sulfonyl-based compound may be input into the prepared preliminary lithium-transition metal composite oxide particle and mixed (e.g., step S20).

For example, the sulfonyl-based compound may be a compound represented by Structural Formula 1 described above. Preferably, the sulfonyl-based compound may include at least one of the compounds of Formulae 1 to 3 described above.

In some embodiments, the sulfonyl-based compound aqueous solution may be formed by inputting the above-described sulfonyl-based compound into a solvent. For example, the solvent may be de-ionized water (DIW).

In exemplary embodiments, the preliminary lithium-transition metal composite oxide particle and the sulfonyl-based compound aqueous solution may be mixed. In this case, the sulfonyl-based compound contained in the sulfonyl-based compound aqueous solution may be converted into a lithium-sulfur-containing portion by reacting with residual lithium present on the surface of the preliminary lithium-transition metal composite oxide particle. Accordingly, the lithium-transition metal composite oxide particle including the primary particles and the lithium-sulfur-containing portion may be obtained.

For example, since ammonium ion (NH4+) contained in the sulfonyl-based compound is an ion made of only non-metal elements, it may be vaporized during a heat treatment process to be described below. In this case, the lithium-sulfur-containing portion may be lithium sulfate ($Li_2SO_4$). Accordingly, only lithium ions remain as cations, such that the lithium ions may smoothly move when charging and discharging the battery.

For example, impurities present on the surface of the preliminary lithium-transition metal composite oxide particle may be removed through the mixing process. For example, in order to improve a yield of lithium metal oxide particles or stabilize a synthesis process, the lithium precursor (lithium salt) may be used in an excess amount. In this case, a lithium precursor including lithium hydroxide (LiOH) and lithium carbonate ($Li_2CO_3$) may remain on the surface of the preliminary lithium-transition metal composite oxide particle.

In addition, for example, as the lithium-transition metal composite oxide particle contain the composition of higher-Ni contents, calcination may be performed at a lower temperature when manufacturing the cathode. In this case, a content of residual lithium on the surface of the lithium-transition metal composite oxide particle may be increased.

When the residual lithium is removed by washing with water (water washing treatment) in substantially the same amount as the cathode active material, the residual lithium may be removed, but oxidation of the surface of the preliminary lithium-transition metal composite oxide particles and side reactions with water may be caused, thereby resulting in a damage or collapse of the layered structure of the primary particles. In addition, as the layered structure is deformed into the face centered cubic structure, spinel structure and/or rock salt structure rather than the hexagonal close-packed structure by water, the lithium-nickel-based oxide may be hydrolyzed to form nickel impurities such as NiO or $Ni(OH)_2$. In this case, since the modified structures are irreversible structures, the movement of lithium may be hindered during charging and discharging. Accordingly, the initial capacity and capacity retention rate of the secondary battery may be decreased.

However, according to exemplary embodiments of the present application, since the mixing process (e.g., initial wetting method) is performed using the sulfonyl-based compound aqueous solution without water washing treatment, passivation due to the potassium-containing compound may be implemented on the surface of the lithium-transition metal composite oxide particles while the mixing process is performed. For example, the lithium-sulfur-containing portion having a monoclinic crystal structure in which lithium and sulfur are bonded between primary particles having a hexagonal close-packed structure may be formed.

The term "initial wetting method" as used herein may refer to, for example, a method of inputting 20 wt. % or less of water or the sulfonyl-based compound aqueous solution by, for instance, a spray method, based on the total weight of the lithium-transition metal composite oxide particles without performing water washing treatment of inputting water in an amount substantially the same as or similar to the total weight of the lithium-transition metal composite oxide particles and stirring.

In addition, since water washing treatment is not performed, for example, the lithium-transition metal composite oxide particle may not include the primary particles having the face centered cubic structure. Therefore, the residual lithium may be effectively removed while preventing oxidation and damage to the layered structure due to water on the particle surface.

For example, when directly mixing (e.g., dry coating) the sulfonyl-based compound powder with the lithium-transition metal composite oxide particle instead of the sulfonyl-based compound aqueous solution, since the sulfonyl-based compound powder does not have a capillary force, it cannot permeate between the primary particles, and most of the sulfonyl-based compound powder may react with the residual lithium on the surface of the secondary particles in which the primary particles are aggregated. In this case, most of the lithium-sulfur-containing portion may be formed in the form of existing on the surface of the secondary particles. Accordingly, the average sulfur signal value in the lithium-sulfur-containing portion may be reduced compared to the average sulfur signal value in the primary particles, which will be described below.

In addition, when performing the dry coating, residual lithium present between the primary particles may not be sufficiently removed. Accordingly, the residual lithium may act as a resistor to reduce the capacity and output properties of the battery.

According to exemplary embodiments of the present application, the initial wetting method may be performed using the sulfonyl-based compound aqueous solution as described above. In this case, the sulfonyl-based compound aqueous solution may permeate between the primary particles by the capillary force, and react with residual lithium between the primary particles to form the lithium-sulfur-containing portion between the primary particles.

For example, since the lithium-sulfur-containing portion has the monoclinic crystal structure, ion conductivity is relatively excellent, thereby suppressing an increase in the battery resistance. Accordingly, it is possible to prevent a reduction in the capacity properties while improving the life-span properties of the battery.

In some embodiments, an amount of the solvent in the sulfonyl-based compound aqueous solution mixed with the preliminary lithium-transition metal composite oxide particle may be 2 to 20 wt. % based on the total weight of the preliminary lithium-transition metal composite oxide particle. In this case, while the lithium-sulfur-containing portion is also formed to have appropriate lithium/sulfur contents at a position where the residual lithium was present on the surface of the preliminary lithium-transition metal composite oxide particle, substantially as in the case of water washing treatment, it is possible to prevent a damage or collapse of the layered structure of the primary particles from being caused.

In some embodiments, the amount of the sulfonyl-based compound input into the solvent may be 0.5 to 2.5 wt. % based on the total weight of the preliminary lithium-transition metal composite oxide particle. In this case, while a sufficient amount of the sulfonyl-based compound reacts with residual lithium to form a lithium-sulfur-containing portion, it is possible to prevent excessively high sulfur content in the cathode active material. Accordingly, it is possible to maintain the output properties while improving the life-span properties of the battery.

After the mixing process, a cathode active material including the primary particles and the lithium-sulfur-containing portion may be obtained through a heat treatment (calcination) process (e.g., step S30).

For example, the preliminary lithium-transition metal composite oxide particle and the lithium-sulfur-containing portion on which the mixing process has been performed may be subjected to heat treatment using a calcination furnace. Accordingly, it is possible to obtain lithium-transition metal composite oxide particles in which the lithium-sulfur-containing portion is fixed between the primary particles.

For example, the heat treatment may be performed at 250 to 450° C. under an oxygen atmosphere. In this case, the residual lithium on the surface of the preliminary lithium-transition metal composite oxide particle and the sulfonyl-based compound in the sulfonyl-based compound aqueous solution may be sufficiently bonded to form the lithium-sulfur-containing portion.

FIGS. 2 and 3 are a schematic plan view and a cross-sectional view of a lithium secondary battery according to exemplary embodiments, respectively.

Hereinafter, description of a lithium secondary battery including a cathode including the cathode active material for a lithium secondary battery described above will be provided with reference to FIGS. 2 and 3.

Referring to FIGS. 2 and 3, the lithium secondary battery may include a cathode 100, an anode 130, and a separation membrane 140 including the cathode active material including the lithium-sulfur-containing portion.

The cathode 100 may include a cathode active material layer 110 formed by applying the above-described cathode active material including the lithium-transition metal oxide particles to a cathode current collector 105.

For example, a slurry may be prepared by mixing and stirring the preliminary lithium-transition metal oxide particles mixed with the sulfonyl-based compound aqueous solution with a binder, a conductive material and/or a dispersant in a solvent. The cathode current collector 105 may be coated with the slurry, followed by compressing and drying to prepare the cathode.

The cathode current collector 105 may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as the binder for forming the cathode. In this case, an amount of the binder for forming the cathode active material layer 110 may be reduced and an amount of the cathode active material may be relatively increased, thereby improving the output and capacity of the secondary battery.

The conductive material may be included to facilitate electron movement between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 130 may include an anode current collector 125 and an anode active material layer 120 formed by coating the anode current collector 125 with an anode active material.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; a silicon compound or tin may be used. Examples of the amorphous carbon may include hard carbon, cokes, mesocarbon microbead (MCMB), mesophase pitch-based carbon fiber (MPCF) or the like. Examples of the crystalline carbon may include graphite-based carbon such as natural graphite, artificial graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The anode current collector 125 may include stainless steel, nickel, aluminum, titanium, copper, or an alloy thereof, and preferably includes aluminum or an aluminum alloy.

In some embodiments, a slurry may be prepared by mixing the anode active material with an anode forming binder, a conductive material and/or a dispersant in a solvent. The anode current collector may be coated with the slurry, followed by compressing and drying to prepare the anode 130.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

The separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/hexene copolymer, ethylene/methacrylate copolymer. The separation membrane 140 may include a nonwoven fabric made of glass fiber having a high melting point, polyethylene terephthalate fiber or the like.

According to exemplary embodiments, an electrode cell is defined by the cathode 100, the anode 130, and the separation membrane 140, and a plurality of the electrode cells are stacked to form a jelly roll type electrode assembly 150, for example. For example, the electrode assembly 150 may be formed by winding, lamination, folding, or the like of the separation membrane 140. The electrode assembly may be housed in an outer case 160 together with the electrolyte, such that a lithium secondary battery may be defined. According to exemplary embodiments, a non-aqueous electrolyte may be used as the electrolyte.

The non-aqueous electrolyte includes a lithium salt as an electrolyte and an organic solvent. The lithium salt is represented by, for example, $Li^+X^-$ and may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like as an example.

Examples of the organic solvent may use any one of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof. These compounds may be used alone or in combination of two or more thereof.

As shown in FIG. 3, electrode tabs (a cathode tab and an anode tab) may protrude from the cathode current collector 105 and the anode current collector 125, respectively, which belong to each electrode cell, and may extend to one side of the outer case 160. The electrode tabs may be fused together with the one side of the outer case 160 to form electrode leads (a cathode lead 107 and an anode lead 127) extending or exposed to an outside of the outer case 160.

The lithium secondary battery may be manufactured, for example, in a cylindrical shape using a can, a square shape, a pouch type or a coin shape.

According to exemplary embodiments, a lithium secondary battery having improved life-span and long-term stability while suppressing a decrease in capacity and average voltage by improving chemical stability of the cathode active material by doping or coating with the sulfonyl-based compound may be implemented.

Hereinafter, experimental examples including specific examples and comparative examples will be described to more concretely understand the present invention. However, those skilled in the art will appreciate that such examples are provided for illustrative purposes and do not limit subject matters to be protected as disclosed in appended claims. Therefore, it will be apparent to those skilled in the art various alterations and modifications of the embodiments are possible within the scope and spirit of the present invention and duly included within the range as defined by the appended claims.

Example 1

Preparation of Preliminary Lithium-Transition Metal Composite Oxide Particles (S10)

$NiSO_4$, $CoSO_4$ and $MnSO_4$ were mixed in a ratio of 0.885:0.090:0.025, respectively, using distilled water from which internal dissolved oxygen is removed by bubbling with $N_2$ for 24 hours. The solution was input into a reactor at 50° C., and a co-precipitation reaction was performed for 48 hours using NaOH and $NH_3H_2O$ as a precipitant and a chelating agent to obtain $Ni_{0.885}Co_{0.09}Mn_{0.025}(OH)_2$ as a transition metal precursor. The obtained precursor was dried at 80° C. for 12 hours, and then again dried at 110° C. for 12 hours.

Lithium hydroxide and the transition metal precursor were added to a dry high-speed mixer in a ratio of 1.01:1, and the mixture was uniformly mixed for 5 minutes. The mixture was put into a calcination furnace, and heated to 730 to 750° C. at a heating rate of 2° C./min, then maintained at 730 to 750° C. for 10 hours. Oxygen was passed continuously at a flow rate of 10 mL/min during heating and maintenance. After completion of the calcination, the mixture was naturally cooled to room temperature, followed by grinding and classification to prepare a preliminary lithium-transition metal composite oxide particle $LiNi_{0.885}Co_{0.09}Mn_{0.025}O_2$.

Preparation and Mixing of Sulfonyl-Based Compound Aqueous Solution (S20), and Heat Treatment (S30)

Ammonium sulfate ($NH_4(SO_4)$) powder in an amount of 1.2 wt. % based on the total weight of the preliminary lithium-transition metal composite oxide particles was input into de-ionized water (DIW) in an amount of 5 wt. % based on the total weight of the preliminary lithium-transition metal composite oxide particles, and then the mixture was stirred so that the ammonium sulfate powder was sufficiently dissolved the in de-ionized water to prepare a sulfonyl compound aqueous solution.

The prepared sulfonyl-based compound aqueous solution was input into the obtained preliminary lithium-transition metal composite oxide particles and mixed.

The mixture was put into the calcination furnace, heated to a temperature of 400° C. at a heating rate of 2° C./min while supplying oxygen at a flow rate of 20 mL/min, and maintained at the heated temperature for 10 hours. After completion of the calcination, the calcined product was classified by 325 mesh to obtain a cathode active material.

Manufacture of Lithium Secondary Battery

A secondary battery was manufactured using the above-described cathode active material. Specifically, the cathode active material, Denka Black as a conductive material, and PVDF as a binder were mixed in a mass ratio composition of 93:5:2, respectively, to prepare a cathode slurry. Then, the slurry was applied to an aluminum current collector, followed by drying and pressing the same to prepare a cathode. After the press, a target electrode density of the cathode was adjusted to 3.0 g/cc.

Lithium metal was used as an anode active material.

The cathode and anode prepared as described above were notched in a circular shape having a diameter of Φ14 and Φ16, respectively, and laminated, then an electrode cell was prepared by disposing a separation membrane (polyethylene, thickness: 13 μm) notched to Φ19 between the cathode and the anode. The prepared electrode cell was put into a coin cell outer case having a specification of diameter of 20 mm and a height of 1.6 mm, then an electrolyte was injected and assembled, followed by aging for 12 hours or more so that the electrolyte could be impregnated inside the electrodes.

The electrolyte used herein was prepared by dissolving 1M $LiPF_6$ solution in a mixed solvent of EC/EMC (30/70; volume ratio).

The secondary battery manufactured as described above was subjected to formation charging-discharging (charge condition: CC-CV 0.1 C 4.3 V 0.005 C CUT-OFF, discharge condition: CC 0.1 C 3 V CUT-OFF).

Example 2

A cathode active material and a lithium secondary battery were obtained according to the same procedures as described in Example 1, except that the ammonium sulfate powder was input into the de-ionized water in an amount of 0.8 wt. % based on the total weight of the preliminary lithium-transition metal composite oxide particle.

Example 3

A cathode active material and a lithium secondary battery were obtained according to the same procedures as described in Example 1, except that the ammonium sulfate powder was input into the de-ionized water in an amount of 1.6 wt. % based on the total weight of the preliminary lithium-transition metal composite oxide particle.

Example 4

A cathode active material and a lithium secondary battery were obtained according to the same procedures as described in Example 1, except that the ammonium sulfate powder was input into the de-ionized water in an amount of 2.0 wt. % based on the total weight of the preliminary lithium-transition metal composite oxide particle.

Example 5

A cathode active material and a lithium secondary battery were obtained according to the same procedures as described in Example 1, except that the ammonium sulfate powder was input into the de-ionized water in an amount of 2.4 wt. % based on the total weight of the preliminary lithium-transition metal composite oxide particle.

Example 6

A cathode active material and a lithium secondary battery were obtained according to the same procedures as described in Example 1, except that ammonium sulfate powder was input into the de-ionized water in an amount of 0.4 wt. % based on the total weight of the preliminary lithium-transition metal composite oxide particle.

Example 7

A cathode active material and a lithium secondary battery were obtained according to the same procedures as described in Example 1, except that the ammonium sulfate powder was input into the de-ionized water in an amount of 2.8 wt. % based on the total weight of the preliminary lithium-transition metal composite oxide particle.

Example 8

A cathode active material and a lithium secondary battery were obtained according to the same procedures as described in Example 1, except that the temperature was raised to 200° C. in the calcination furnace.

Example 9

A cathode active material and a lithium secondary battery were obtained according to the same procedures as described in Example 1, except that the temperature was raised to 500° C. in the calcination furnace.

Example 10

A cathode active material and a lithium secondary battery were obtained according to the same procedures as described in Example 1, except that the same amount of ammonium sulfamate ($NH_4$ ($SO_3NH_2$)) was input into the de-ionized water instead of the ammonium sulfate.

Example 11

A cathode active material and a lithium secondary battery were obtained according to the same procedures as described in Example 1, except that the same amount of sulfamic acid ($SO_2NH_2OH$) was input into the de-ionized water instead of the ammonium sulfate.

Comparative Example 1

A cathode active material and a lithium secondary battery were obtained according to the same procedures as described in Example 1 except that i) to iii) as below,
i) without performing the step of mixing the preliminary lithium-transition metal composite oxide particles with the sulfonyl-based compound aqueous solution,
ii) the preliminary lithium-transition metal composite oxide particles were input into 100 wt. % of de-ionized water based on the total weight of the preliminary lithium-transition metal composite oxide particles, and iii) the mixture was subjected to water washing treatment by stirring for 10 minutes, followed by drying at 130 to 170° C. under vacuum for 12 hours after filtering.

Comparative Example 2

A cathode active material and a lithium secondary battery were obtained according to the same procedures as described in Example 1, except that de-ionized water was input in an amount of 5 wt. % based on the total weight of the preliminary lithium-transition metal composite oxide particles instead of the sulfonyl-based compound aqueous solution and mixed.

The above-described examples and Comparative Example 2 were performed by the initial wetting method in which a small amount of solution or water was input, not the water washing treatment in which substantially the same amount of water as the cathode active material was input, and in Comparative Example 1, the water washing treatment was performed.

Comparative Example 3

A cathode active material and a lithium secondary battery were obtained according to the same procedures as described in Example 1, except that, ammonium sulfate ($NH_4(SO_4)$) powder was input in an amount of 1.2 wt. % based on the total weight of the preliminary lithium-transition metal composite oxide particle and mixed with the preliminary lithium-transition metal composite oxide particle (dry mixing) instead of the sulfonyl-based compound aqueous solution.

Process types, types and input amounts of the sulfonyl-based compound, and heat treatment temperatures of the above-described examples and comparative examples are shown in Table 1 below.

TABLE 1

| Section | Process type | Sulfonyl-based compound type | sulfonyl-based compound input amount (wt. %) | Heat treatment temperature (° C.) |
|---|---|---|---|---|
| Example 1 | Initial wetting | Ammonium sulfate | 1.2 | 400 |
| Example 2 | Initial wetting | Ammonium sulfate | 0.8 | 400 |
| Example 3 | Initial wetting | Ammonium sulfate | 1.6 | 400 |
| Example 4 | Initial wetting | Ammonium sulfate | 2.0 | 400 |
| Example 5 | Initial wetting | Ammonium sulfate | 2.4 | 400 |
| Example 6 | Initial wetting | Ammonium sulfate | 0.4 | 400 |
| Example 7 | Initial wetting | Ammonium sulfate | 2.8 | 400 |
| Example 8 | Initial wetting | Ammonium sulfate | 1.2 | 200 |
| Example 9 | Initial wetting | Ammonium sulfate | 1.3 | 500 |
| Example 10 | Initial wetting | Ammonium sulfamate | 1.2 | 400 |
| Example 11 | Initial wetting | Sulfamic acid | 1.2 | 400 |
| Comparative Example 1 | Water washing treatment | — | — | 400 |
| Comparative Example 2 | Water washing treatment | — | — | 400 |
| Comparative Example 3 | Dry mixing | Ammonium sulfate | 1.2 | 400 |

Experimental Example (1) TEM-EDS (Transmission Electron Microscope-Energy Dispersive Spectroscopy) Image Analysis The lithium-transition metal composite oxide particles prepared according to the above-described examples and comparative examples were continuously measured by line scan to obtain nickel and sulfur signal values in a primary particle region and the region between the primary particles (e.g., lithium-sulfur-containing portion) through STEM-EDS. Thereafter, by averaging the sulfur signal values for each region, an average sulfur signal value of the primary particles and the lithium-sulfur-containing portion was calculated.

(2) Measurement of Sulfur (S) Content

To measure a content of sulfur (S) of the lithium-transition metal composite oxide particles obtained according to the above-described examples and comparative examples, a C/S analyzer (carbon/sulfur analysis equipment; model name: CS844, manufacturer: LECO) was used, and an amount of sample was selected according to the range of measurement values of the standard sample measured when drawing up a calibration curve.

Specifically, 0.02 to 0.04 g of lithium-transition metal composite oxide particles obtained according to the above-described examples and comparative examples were input into the ceramic crucible, and a combustion improver (LECOCEL II) and IRON chips were mixed in a ratio of 1:1 together. Thereafter, $O_2$ was supplied as a combustion gas at 3 L/min in a high-frequency induction furnace and burned at about 2,600 to 2,700° C., and the sulfur oxide-based inorganic compound gas (e.g., sulfuric acid gas) generated by the combustion was passed through an infrared detection cell. At this time, a change in infrared absorption compared to the blank was measured to quantitatively detect the sulfur content in the lithium-transition metal composite oxide particles.

(3) Measurement of Residual Lithium ($Li_2CO_3$, LiOH) Content 1.5 g of each of the cathode active materials of the examples and comparative examples was quantified in a 250 mL flask, 100 g of deionized water was input then a magnetic bar was put thereto, and the mixture was stirred at a speed of 60 rpm for 10 minutes. Thereafter, 100 g was sampled after filtering using a flask at reduced pressure. The sampled solution was put into a container of automatic titrator and automatically titrated with 0.1N HCl referring to the Wader's method to measure $Li_2CO_3$ and LiOH contents in the solution.

(4) Measurement of Initial Charge/Discharge Capacity and Evaluation of Initial Capacity Efficiency After charging (CC-CV 0.1 C 4.3 V 0.005 C CUT-OFF) the lithium secondary batteries manufactured according to the above-described examples and comparative examples in a chamber at 25° C., battery capacities (initial charge capacities) were measured, and after discharging again (CC 0.1 C 3.0 V CUT-OFF) the same, the battery capacities (initial discharge capacities) were measured.

Initial capacity efficiency of each lithium secondary battery was calculated by dividing the measured initial discharge capacity by the measured initial charge capacity, then converting it into a percentage (%).

(5) Measurement of Capacity Retention Rate (Life-Time (Cycle) Properties) During Repeated Charging and Discharging The lithium secondary batteries according to the examples and comparative examples were repeatedly charged (CC/CV 0.5 C 4.3 V 0.05 C CUT-OFF) and discharged (CC 1.0 C 3.0 V CUT-OFF) 100 times, then the capacity retention rate was evaluated as a percentage of the discharge capacity at 100 times divided by the discharge capacity at one time.

(6) Calculation of Sulfur Signal Ratio

In the lithium-transition metal composite oxide particles obtained according to Examples 1 to 9 and Comparative Examples 2 and 3, lithium and sulfur signals in the primary particle region and the lithium-sulfur-containing portion were measured through SEM-EDS.

Thereafter, an average sulfur signal value was measured by averaging the sulfur signal values for each of the primary particle region and the lithium-sulfur-containing portion, and then the average sulfur signal value of the lithium-sulfur-containing portion was divided by the average sulfur signal value in the primary particles to calculate a sulfur signal ratio.

The evaluation results are shown in Table 2 below.

FIGS. 4(a) and 4(b) are image and graphs, respectively, illustrating energy dispersive spectroscopy (TEM-EDS) analysis results for analyzing chemical properties of the lithium-transition metal composite oxide particles according to Example 1. Specifically, FIG. 4(a) is an image illustrating the primary particles of the lithium-transition metal composite oxide particles obtained according to Example 1 and the region between the primary particles, and FIG. 4(b) is graphs illustrating nickel and sulfur signal values of the primary particle region and the region (e.g., lithium-sulfur-containing portion) between primary particles of Example 1.

Referring to FIG. 4, the primary particles and the lithium-sulfur-containing portion may be distinguished through a transition of nickel signal value. As shown in FIG. 4, in the case of Example 1, it can be seen that the nickel signal in the lithium-sulfur-containing portion is decreased and the sulfur signal is increased. Accordingly, the primary particles may be high-Ni particles, and the lithium-sulfur-containing portion may be an interface between the primary particles, wherein a sulfur component may be concentrated.

FIG. 5 is a selected area electron diffraction (TEM-SAED) analysis image for evaluating crystallographic properties of the lithium-sulfur compound of the lithium-transition metal composite oxide particles according to Example 1.

Referring to FIG. 5, it can be confirmed that the lithium-sulfur compound of the lithium-transition metal composite oxide particles of Example 1 prepared through the initial wetting method has a monoclinic crystal structure.

Specifically, in order to analyze the crystal structure on the cross-sections of the lithium-transition metal composite oxide particles obtained according to the above-described Example 1, a TEM-SAED analysis was performed on the lithium-sulfur-containing portion present between the primary particles. The lithium-sulfur-containing portion was designated by a selected area aperture and then entered into a diffraction mode to obtain a diffraction image. A [010] region of the monoclinic crystal structure may be confirmed through the obtained diffraction image.

Referring to Table 2, the examples in which the initial wetting method was performed by mixing the sulfonyl-based compound aqueous solution exhibited good initial capacity efficiency and capacity retention rate while reducing the lithium content remaining on the surface of the lithium-transition metal composite oxide particles compared to the comparative examples as a whole.

TABLE 2

| Section | Sulfur content (ppm) | Sulfur signal ratio | $Li_2CO_3$ content (ppm) | LiOH content (ppm) | Initial charge capacity (mAh/g) | Initial discharge capacity (mAh/g) | Initial capacity efficiency (%) | Capacity retention rate (%) |
|---|---|---|---|---|---|---|---|---|
| Example 1 | 3,200 | 2.0 | 1,880 | 1,400 | 238.8 | 213.8 | 89.5% | 87 |
| Example 2 | 2,400 | 1.5 | 2,240 | 1,690 | 238.7 | 213 | 89.2% | 85 |
| Example 3 | 4,100 | 2.5 | 1,690 | 1,330 | 238.8 | 212.9 | 89.2% | 86 |
| Example 4 | 5,000 | 3.1 | 1,660 | 1,510 | 238.4 | 211.8 | 88.8% | 86 |
| Example 5 | 6,200 | 3.6 | 1,520 | 1,760 | 238.3 | 210.2 | 88.2% | 87 |
| Example 6 | 1,900 | 1.1 | 2,610 | 2,020 | 238.5 | 212.5 | 89.1% | 82 |
| Example 7 | 7,100 | 3.9 | 1,390 | 1,660 | 238.6 | 209.5 | 87.8% | 86 |
| Example 8 | 3,000 | 1.9 | 2,520 | 1,910 | 238.8 | 214.4 | 89.8% | 79 |
| Example 9 | 3,100 | 2.0 | 1,590 | 1,220 | 238.6 | 208.3 | 87.3% | 87 |
| Example 10 | 2,700 | — | 1,660 | 1,560 | 238 | 213.4 | 89.7% | 86 |
| Example 11 | 2,800 | — | 1,080 | 1,850 | 238.8 | 212.5 | 89.0% | 86 |
| Comparative Example 1 | 130 | — | 1,230 | 1,390 | 237.1 | 209 | 88.1% | 62 |
| Comparative Example 2 | 1,100 | 1.0 | 3,010 | 2,630 | 238.3 | 212.1 | 89.0% | 80 |
| Comparative Example 3 | 3,000 | 1.2 | 3,500 | 2,500 | 237.2 | 207.8 | 87.6% | 88 |

However, in the case of Example 6 in which the sulfonyl-based compound was input in an amount of less than 0.5 wt. %, the residual lithium was slightly increased due to an insufficient amount of the sulfonyl-based compound to react with the residual lithium, and the capacity retention rate was also reduced, compared to Examples 1 to 5.

In addition, in the case of Example 7 in which the sulfonyl-based compound was input exceeding 2.5 wt. %, residual lithium was sufficiently removed, but excess sulfur remained, thereby reducing the initial capacity and capacity efficiency of the battery.

Further, in the case of Example 8 in which the heat treatment temperature was less than 250° C., the capacity efficiency was excellent, but reactivity with the residual lithium was relatively decreased, such that the residual lithium was relatively increased. Furthermore, since an ammonium functional group present in the sulfonyl-based compound does not sufficiently react with lithium or is not vaporized at a low temperature and remains as an impurity in the lithium-transition metal composite compound particles, battery properties including life-span properties were deteriorated.

In addition, in the case of Example 9 in which the heat treatment temperature was greater than 450° C., the life-span properties were maintained, but the capacity efficiency was greatly decreased. Specifically, the lithium-sulfur-containing compound having the monoclinic structure might have improved structural crystallinity and increased bonding strength with lithium as the heat treatment temperature was increased. Accordingly, the lithium ion conductivity through the paddle-wheel mechanism was reduced, thereby decreasing the capacity efficiency.

In the case of Comparative Example 1 using the conventional water washing method, the residual lithium was removed to a high level, but as the layered structure of the primary particles was deformed during the water washing treatment, the initial capacity, efficiency, life-span and electrochemical properties were greatly reduced.

In the case of Comparative Example 2 using the initial wetting method, but not using the sulfonyl-based compound, the residual lithium was not sufficiently removed.

In the case of Comparative Example 3, in which dry coating was performed using powder rather than the sulfonyl-based compound solution, the residual lithium in the region between the primary particles was not sufficiently reacted, such that the residual lithium was measured to be high, and thus the resistance was high. Thereby, electrochemical properties such as initial capacity and efficiency were reduced.

Further, in Examples 1 to 5, a ratio of the average sulfur signal value in the region between the primary particles to the average sulfur signal value in the primary particles (the sulfur signal ratio) satisfied a range of 1.2 to 3.8.

As an example, in the case of Example 1, the signal ratio of sulfur was shown as 1.9 times from the region between the primary particles (e.g., lithium-sulfur-containing portion) to the 40 nm section.

However, Example 6, in which the amount of the sulfonyl-based compound powder input was less than 0.5 wt. % based on the preliminary lithium-transition metal composite oxide particles, exhibited a low sulfur signal ratio of less than 1.2 times, such that it was somewhat difficult to determine the lithium-sulfur-containing portion in lithium-transition metal composite oxide particles.

In addition, in the case of Example 7, in which the amount of the sulfonyl-based compound powder was greater than 2.5 wt. % based on the preliminary lithium-transition metal composite oxide particles, the sulfur signal ratio exceeded 3.8 times.

Further, in the case of Comparative Example 3, in which the sulfonyl-based compound powder was input and dry coating was performed, the sulfur signal ratio in the region between the primary particles was 1.2 based on that of the region within the primary particles, which was measured significantly lower than 1.9 of Example 1 in which the initial wetting method was performed by inputting the same amount of the sulfonyl-based compound in the form of an aqueous solution.

DESCRIPTION OF REFERENCE NUMERALS

100: Cathode
105: Cathode current collector
107: Cathode lead
110: Cathode active material layer
120: Anode active material layer
125: Anode current collector
127: Anode lead
130: Anode
140: Separation membrane
150: Electrode assembly
160: Case

What is claimed is:

1. A method of manufacturing a cathode active material for a lithium secondary battery comprising:
   preparing a preliminary lithium-transition metal composite oxide particle;
   mixing the preliminary lithium-transition metal composite oxide particle with a sulfonyl-based compound aqueous solution including the sulfonyl-based compound represented by Structural Formula 1 below; and
   performing a drying and a heat treatment on the mixed preliminary lithium-transition metal composite oxide particle and the sulfonyl-based compound aqueous solution, to prepare a lithium-transition metal composite oxide particle comprising a plurality of primary particles and a lithium-sulfur-containing portion formed between the primary particles,
   wherein a sulfur content in the lithium-transition metal composite oxide particle measured through a carbon-sulfur (CS) analyzer is 2,000 to 7,000 ppm based on a total weight of the lithium-transition metal composite oxide particle:

[Structural Formula 1]

(In Structural Formula 1, n is 0≤n<3, $R_1$ and $R_2$ are O⁻, $NH_2$, $NH_3^+$, OH, or a hydrocarbon group having 1 to 3 carbon atoms that can be substituted with a substituent, and the substituent includes a halogen, cyano group, hydroxyl group, phosphoric acid group, carboxyl group or a salt thereof).

2. The method of manufacturing a cathode active material for a lithium secondary battery according to claim 1, wherein the lithium-sulfur-containing portion has a monoclinic crystal structure.

3. The method of manufacturing a cathode active material for a lithium secondary battery according to claim 1, wherein an average sulfur signal value of the lithium-sulfur-containing portion measured through energy dispersive spectroscopy (EDS) is greater than the average sulfur signal value in the primary particles measured through the EDS.

4. The method of manufacturing a cathode active material for a lithium secondary battery according to claim 3, wherein the average sulfur signal value of the lithium-sulfur-containing portion measured through the EDS is 1.2 to 3.8 times greater than the average sulfur signal value in the primary particles measured through the EDS.

5. The method of manufacturing a cathode active material for a lithium secondary battery according to claim 1, wherein the hydrocarbon group included in R1 and R2 in Structural Formula 1 is substituted with or connected to at least one selected from the group consisting of a carbon-carbon double bond, —O—, —S—, —CO—, —OCO—, —SO—, —CO—O—, —OCO—O—OCO—, —S—CO—, —S—CO—O—, —CO—NH—, —NH—CO—O—, —NR'—,

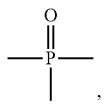

S—S— and —SO2—, and R' is a hydrogen atom or an alkyl group having 1 to 3 carbon atoms.

6. The method of manufacturing a cathode active material for a lithium secondary battery according to claim 1, wherein the sulfonyl-based compound includes at least one of compounds of Formulae 1 to 3 below:

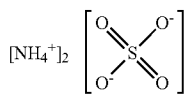
[Formula 1]

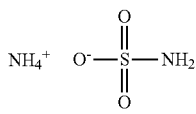
[Formula 2]

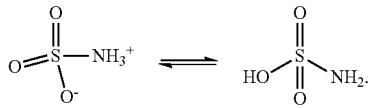
[Formula 3]

7. The method of manufacturing a cathode active material for a lithium secondary battery according to claim 1, wherein the primary particles have a hexagonal close-packed structure.

8. The method of manufacturing a cathode active material for a lithium secondary battery according to claim 1, wherein a content of lithium carbonate ($Li_2CO_3$) remaining on the surface of the lithium-transition metal composite oxide particle is 2,500 ppm or less based on the total weight of the lithium-transition metal composite oxide particle, and a content of lithium hydroxide (LiOH) remaining on the surface of the lithium-transition metal composite oxide particle is 2,000 ppm or less based on the total weight of the lithium-transition metal composite oxide particle.

9. The method of manufacturing a cathode active material for a lithium secondary battery according to claim 1, wherein the sulfonyl-based compound aqueous solution is formed by inputting the sulfonyl-based compound into a solvent, and a weight of the solvent is 2 to 20% by weight based on the total weight of the preliminary lithium-transition metal composite oxide particle.

10. The method of manufacturing a cathode active material for a lithium secondary battery according to claim 9, wherein an amount of the sulfonyl-based compound input into the solvent is 0.5 to 2.5% by weight based on the total weight of the preliminary lithium-transition metal composite oxide particle.

11. The method of manufacturing a cathode active material for a lithium secondary battery according to claim 1, wherein the heat treatment is performed at 250 to 450° C. under an oxygen atmosphere.

12. The method of manufacturing a cathode active material for a lithium secondary battery according to claim 1, wherein the preliminary lithium-transition metal composite oxide particle is mixed with the sulfonyl-based compound aqueous solution without water washing treatment.

13. A lithium secondary battery comprising:

a cathode comprising a cathode active material layer including the cathode active material for a lithium secondary battery manufactured by the method of claim 1; and an anode disposed to face the cathode.

* * * * *